United States Patent [19]
Mendoza

[11] 3,861,715
[45] Jan. 21, 1975

[54] DIRECT TRANSMISSION SYSTEM FOR BICYCLES

[76] Inventor: Hector Mendoza, Adolqo Prieto No. 1709, Mexico City, Mexico

[22] Filed: Aug. 13, 1973

[21] Appl. No.: 387,856

[30] Foreign Application Priority Data
June 21, 1973 Mexico .............................. 144385

[52] U.S. Cl. ............................................ 280/260
[51] Int. Cl. ............................................ B62m 1/02
[58] Field of Search ............ 280/260, 249; 74/750 B

[56] References Cited
UNITED STATES PATENTS
747,789  12/1903  Somerby ............................ 280/260
FOREIGN PATENTS OR APPLICATIONS
593,627  5/1959  Italy ................................... 280/260

*Primary Examiner*—M. Henson Wood, Jr.
*Assistant Examiner*—Michael Mar
*Attorney, Agent, or Firm*—Ladas, Parry, Von Gehr, Goldsmith & Deschamps

[57] ABSTRACT

This invention concerns with a direct transmission system for bicycles including a cylindrical axle which is the bicycle's central axis. It also has pedals fixed to the ends of the cylindrical axle, a crown wheel fixed by means of threads to an end portion of the cylindrical axle, a shaft, conical gears fixed to the ends of the shaft, one of which gears is indented to the crown wheel, a free wheel mechanism coupled to the other one of the conical gears and housing means containing the aforementioned pieces.

11 Claims, 5 Drawing Figures

DIRECT TRANSMISSION SYSTEM FOR BICYCLES

BACKGROUND OF THE INVENTION

The bicycle is one of the most widely and well-known vehicles in the world today. Since it was first invented, it has undergone a series of changes from a rigid and uncomfortable foot-driven vehicle without joints for driving the wheels, until the present day when bicycles even have gear shift mechanisms. In spite of the foregoing, in all the models which have been developed with the exception of the very first bicycle, transmission has been by means of chains.

The first chain transmissions included a pedal gear consisting of a dentated plate to which a chain was coupled. The other end of said chain was engaged to a pinion joined to the shaft of the rear wheel, being this pinion integral to the wheel; consequently, the bicycle rider was forced to pedal with out stopping.

Logically, this type of transmission was very impractical and thus free transmission was invented. By this system the pinion was not integral to the rear wheel, thus allowing it to continue rolling even when the bicycle rider stopped pedaling.

In the mentioned transmissions, forward motion is a function of the ratio of the number of teeth between the dentated plate and the pinion. Thus, a change in the bicycle depending on the type of forward motion required by the changes in the road was not possible and a multiple gear shift system was added to this system. The multiple gear shift system, basically, consist of providing the rear wheel with a set of pinions of a different number of teeth, as well as, a device allowing the chain to pass from one of the pinions to another. In this way, a change in the ratio between the dentated plate and the pinion is achieved together with variations in the type of forward motion of the bicycle.

Chain transmission presents a series of problems, since generally speaking, it has an exposed mechanism. Thus, for example, it is easy for the bicycle driver to soil himself with the grease on the transmission mechanism. Also, on occasions, if the driver is wearing pants the cuffs could be grabbed by the chain and the dentated plate causing a serious problem.

As a consequence of the above a cover around the dentated plate and chain was designed, which cover housed the upper portion of same, so it partially prevent the mentioned problems. Nevertheless, the results are not satisfactory since the cover is generally bulky not allowing free pedaling motion. Likewise, it allows foreign matter to be accumulated in the inside, which matter can interfere in the functioning of the bicycle transmission. On the other hand, to provide the necessary maintenance of the transmission, said cover must be removed making still another inconvenience to the foregoing list.

OBJECTS OF THE INVENTION

Therefore, one of the objects of this invention is to provide a direct transmission system for bicycles with an unexposed mechanism.

Another of the objects of the invention is to provide a direct transmission system for bicycles by which the rider cannot be stained with grease.

Another object is to make it impossible for the transmission system to interfere with and damage the rider's pants cuffs.

Still another of the invention's objects is to provide a direct transmission system for bicycles which does not impede appropriate pedaling since it occupies the minimim possible volume.

Another object of this invention is providing an easily maintained direct transmission system for bicycles.

An additional object of the invention is to provide a direct transmission system for bicycles which prevents foreign matter to be accumulated interfering in its functioning.

Lastly, a final object of this invention is to provide a direct transmission system for bicycles comprising a cylindrical axle which is the bicycle's central axis; fixed pedals at the ends of the cylindrical axis; a crown wheel threadly fixed to one portion of the cylindrical axis; a shaft; conical gears fixed to the ends of the shaft, one of which gears, is indented to the crown wheel; a free wheel mechanism coupled to the other conical gear; and housing means for all the above-listed pieces.

These and other objects to be fulfilled by applying this invention will be better understood and appreciated by reading the following description referring to the drawings of the preferred embodiment of same.

DESCRIPTION OF THE DRAWINGS

FIG. number 1 is a vertical view, illustrating the direct transmission system for bicycles of the present invention, being this system coupled to a bicycle and showing completely the vehicle.

FIG. number 2 is a vertical side view, which illustrates in detail the direct transmission system of the invention coupled to a bicycle and partially shows the wheel, pedals and the tubes of the bicycle frame.

FIG. number 3 is a detailed top plan view, illustrating the direct transmission system for bicycles which system is coupled to a bicycle and partially showing the wheel, the pedals and the vertical and inclined tubes of the frame.

FIG. number 4 is a conventional detailed cross section view illustrating one of the end portions of the direct transmission system for bicycles of this invention.

Figure 4:
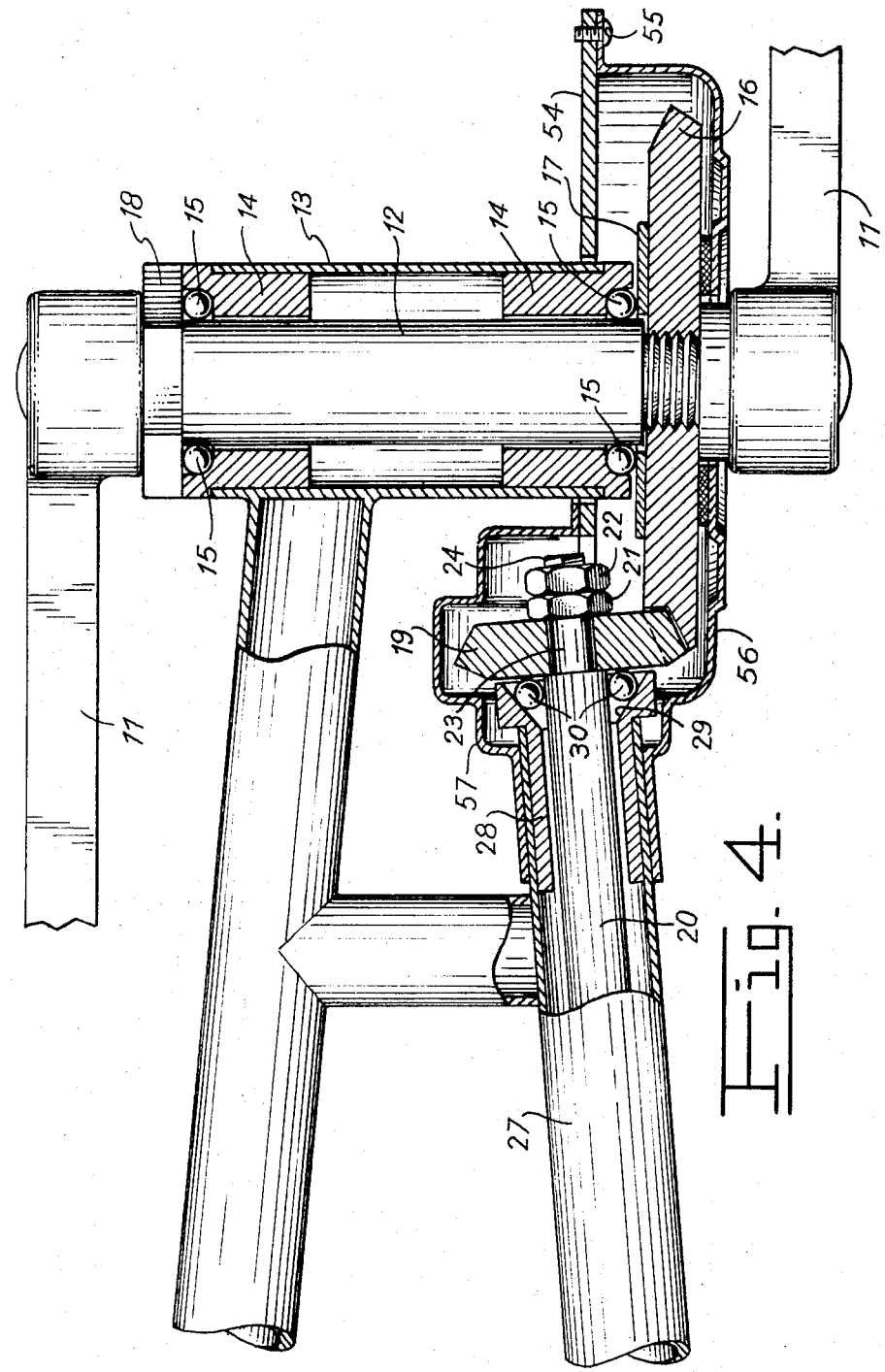

FIG. number 5 is a conventional detailed cross section view illustrating the end portion of the bicycle direct transmission of the invention, opposite to that illustrated in FIG. 4.

DETAILED DESCRIPTION OF THE INVENTION

This invention related to bicycles and, more specifically, to a direct transmission system for bicycles which seeks to substitute the well-known chain transmission system. This direct transmission system consist of pedals 11 usual in all bicycles for applying the movement. These pedals 11 are coupled to the ends of a cylindrical axle or central axis 12, as illustrated in FIG. number 4. Said cylindrical axle 12 is supported by a suitable housing, which in this case is a supporting tube 13 included in the joint of the inclined tube, the vertical tube and the lower back fork of the bicycle frame, corresponding these tubes respectively to the tube holding the handlebar, the seat tube and the fork tubes supporting the rear wheel.

The cylindrical axle 12 is fixed within the supporting tube 13 by means of pressure bushings 14, which slightly protrude on one of their ends from said supporting tube 13. At these protruding ends the bushings 14 include recesses wherein balls 15 are housed. By means of these balls 15 the suitable rotation of the mentioned cylindrical axle 12 is allowed.

On the other hand the cylindrical axle 12 has threaded in one of its portions and exteriorly to the supporting tube 13, a conical gear or crown wheel 16. There is a washer 17 placed between the crown wheel 16 and the end of the bushing 14 including the balls 15, so as to allow these balls 15 to move in a suitable trajectory. The type of thread with which the crown wheel 16 is fixed to the cylindrical axle 12 should necessarily be left-threaded, if the mentioned crown wheel 16 is on the right side of the cylindrical axle 12 and vice versa if said crown wheel 16 is on the left side. Left and right sides are considered with regard to the forward direction of the bicycle. The foregoing definitively is in this form, because otherwise the crown wheel 16 would become unscrewed when force is applied by means of the pedals 11.

The end of the cylindrical axle 12 opposite to that including the crown wheel 16, includes threadly fixed a disk or nut 18, which nut 18 receives the pressure exerted by the crown wheel 16 and allows the balls 15 included in the bushing 14 of this end to have a free motion. The threaded coupling of the nut 18 is based on the same principles as those of the crown wheel 16 so as to prevent it from unscrewing.

The next phase of the transmission system of this invention is the indentation of the crown wheel 16 with a conical gear or pinion 19 of a smaller diameter than said crown wheel 16 and which pinion 19 is fixed to the end of a shaft 20 by means of a nut 21 and a nut lock 22. This indentation between the crown wheel 16 and the pinion 19 is regulated by means of the washer 17, since according to its thickness or thinness the mentioned pieces will be less or more deeply toothed. In addition, a slight displacement of the pinion 19 is allowed, because the end of the shaft 20 which fastens it, is ended by a plain square section portion 23 and a threaded portion 24; so that the pinion 19 is supported on the plain square section portion 23 and the nut 21 and nut lock 22 are coupled to the threaded portion 24.

Figure 5:
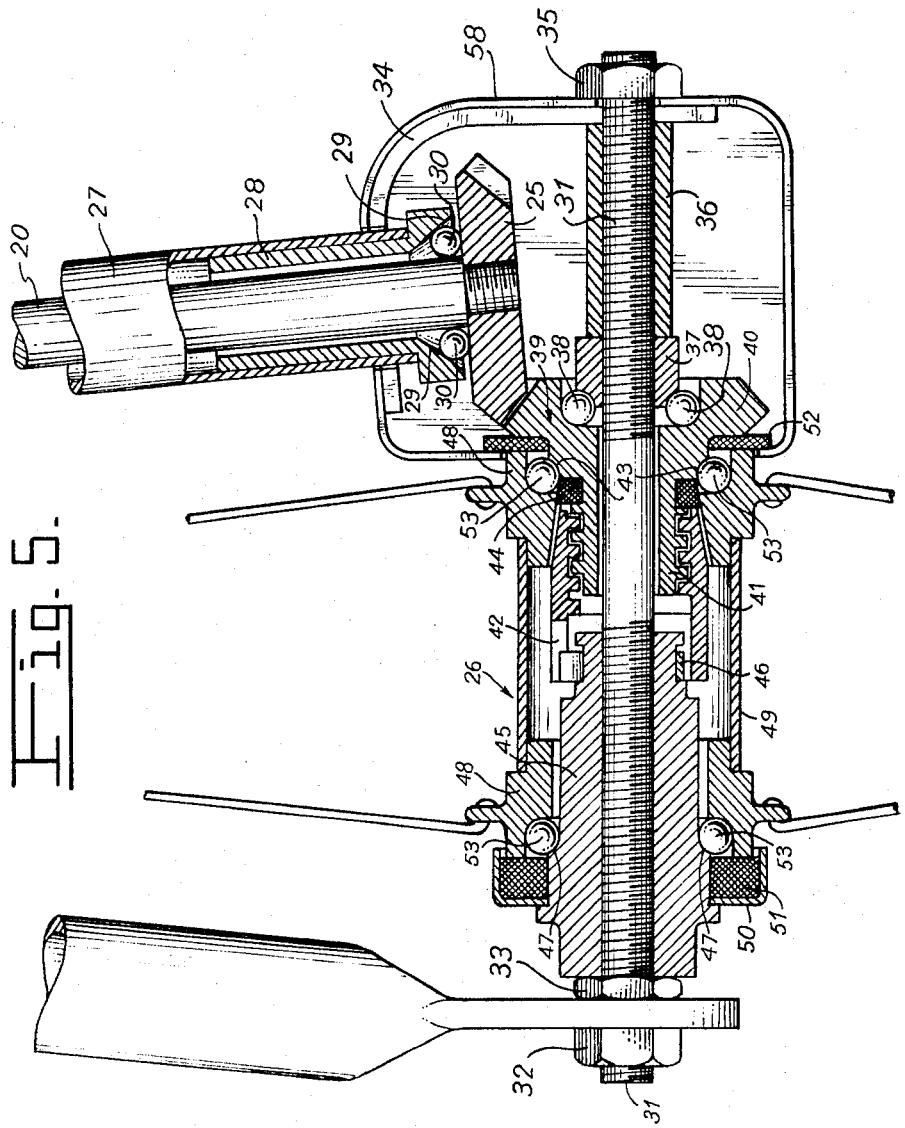

The end of the shaft 20 opposite to that including the pinion 19, includes a conical gear 25 fixed by threading and inter-coupled to a free wheel mechanism 26, as we can see in FIG. 5.

The shaft 20 is supported by a suitable housing which in this case is one of the tubes 27 of the lower back fork. In order for the shaft 20 to obtain its necessary rotation, it is fixed to the tube 27 in a manner similar to that in which the cylindrical axle 12 is fastened the supporting tube 13: i.e., it is fixed by means of pressure bushings 20 which have one of their ends protruding slightly from the tube 27. At these protruding ends the bushings 28 registering with the pinion 19 and the conical gear 25 include recesses, which are interiorly cut at an angle thus providing a chamfer 29 at these ends. The chamfers 29 house balls 30 so, because the slope of said chamfers 29, the balls 30 allow the shaft 20 to turn without play or vibrations on receiving the initial pressure when set into motion.

The free wheel mechanism 26 is comprised of a threaded axle 31 which is the axle of the bicycle rear wheel and which is fixed to the lower back fork of the same. The axle 31 is fixed to the lower back fork, at one end of the tube of said fork opposite to the tube 27, by means of a nut 32 and a nut lock 33 and it is fixed to the tube 27 by means of an angled beam 34, which is welded on one end to said tube 27, the other end of the beam 34 fixes the end of the axle 31 by a nut 35. This end of the axle 31 is fixed by the nut 35 as well as, interiorly to the beam 34, by means of an interiorly threaded tubular piece which acts as a nut lock and spacer 36. The above piece is considered as a nut lock and spacer 36 because it separates from the end of the axle 31 and at the same time it fixes a cone 37 which is threadely coupled at said axle 31 following the spacer 36. The spacer 36 also has the purpose of providing a greater resistance to the axle 31 at this point.

The end of the cone 37 opposite to the spacer 36, includes recesses housing balls 38 that allow a mobile cone 39 or piece providing movement to the bicycle rear wheel and which is coupled to the axle 31, to rotate because of the effect of the conical gear 25 with which it is indented. This mobile cone 39 is made up of a conical gear portion 40 at one end and an externally threaded cylindrical portion 41 on the other. The conical gear portion 40 includes a central recess registering with the axle 31, which central recess in conjunction with the recess of cone 37 makes up the trajectory of the balls 38.

Following the mobile cone 39, and coupled to the threaded portion 41 of same, a sleeve 42 is included whose portion registering with the cylindrical portion 41 is threaded on the inside and it is tapered, and whose remaining portion is tubular.

In addition, the mobile cone 39 includes between the conical gear portion 40 and the threaded portion 41 a protrusion in the form of a shoulder 43 on which a stopping device 44 is supported registering with the beginning of the thread of the threaded portion 41. By this stopping device 44 the total trajectory of the sleeve 42 is hindered along said threaded portion 41. This stopping device 44 can be a gasket, as illustrated in the figures, or it can be a washer and a spring that force the sleeve 42 to maintain a certain trajectory as already indicated.

After the above mentioned pieces, a fixed cone 45 is provided coupled by means of threading to the axle 31, which fixed cone 45 has one of its ends slightly lodged in the tubular portion of the sleeve 42 and the other of its ends registering with the nut lock 33. The end portion of the fixed cone 45 which is lodged in the sleeve 42, is such that it permits the presence of, while it supports, a spiral spring 46 or circular arc plate with a projecting fold, that guides the sleeve 42 in its displacement through the threaded portion 41. The fixed cone 45 also includes in a central portion a shoulder 47 similar to that of the mobile cone 39.

Around the fixed cone 47 and mobile cone 39 the hub of the rear wheel of the bicycle is provided. This hub is composed of three elements, viz., two supporting end portions 48 for the bicycle wheel spokes and a central tubular portion 49 to couple said supporting portion 48. The bicycle hub, formed in this way, is fixed by one of its ends by means of a plate-fitting 50 and a gasket 51 fastened by the fixed cone 45 and on the other of its ends by means of a relevant gasket 52 and the conical gear portion 40 of the mobile cone 39. This is feasible, since as indicated, the mobile cone 39 is driven by the spacer 36 and the cone 37.

Thus, gaskets 51 and 52 are in direct contact with the hub and as a result, they must be manufactured of a suitable material which allows rotation of the hub. In addition, another function of gaskets 51 and 52 besides that mentioned, is that of preventing the entrance of foreign objects to the inside of the free wheel mechanism 26.

As it is known, the hub is the piece providing rotation to the bicycle wheel and thus it necessarily includes balls 53, the trajectory of which is governed by inside recesses at the end portions 48 of said hub and by the shoulders 43 and 47 of the mobile cone 39 and fixed cone 45, with which said end portions 48 are respectively registering.

Figure 1:
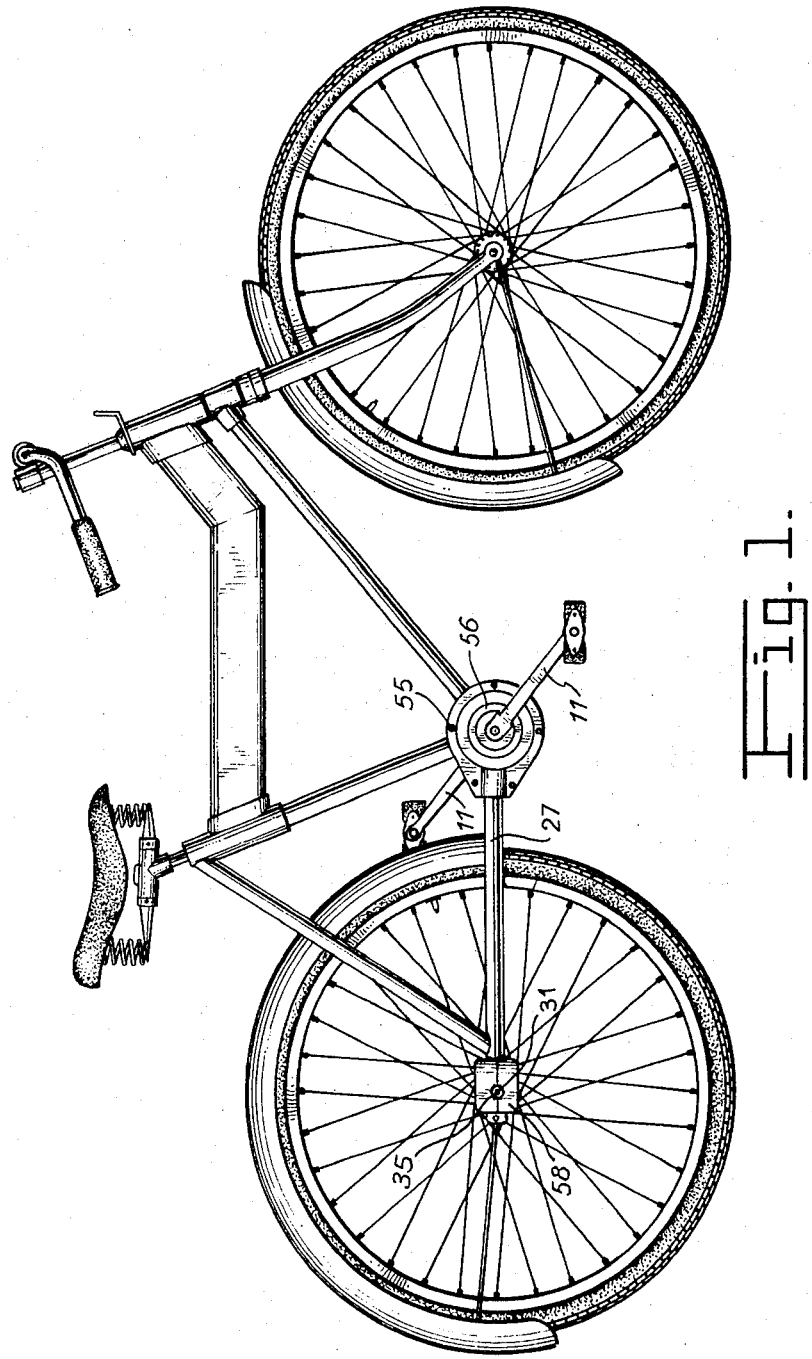
Figure 2:
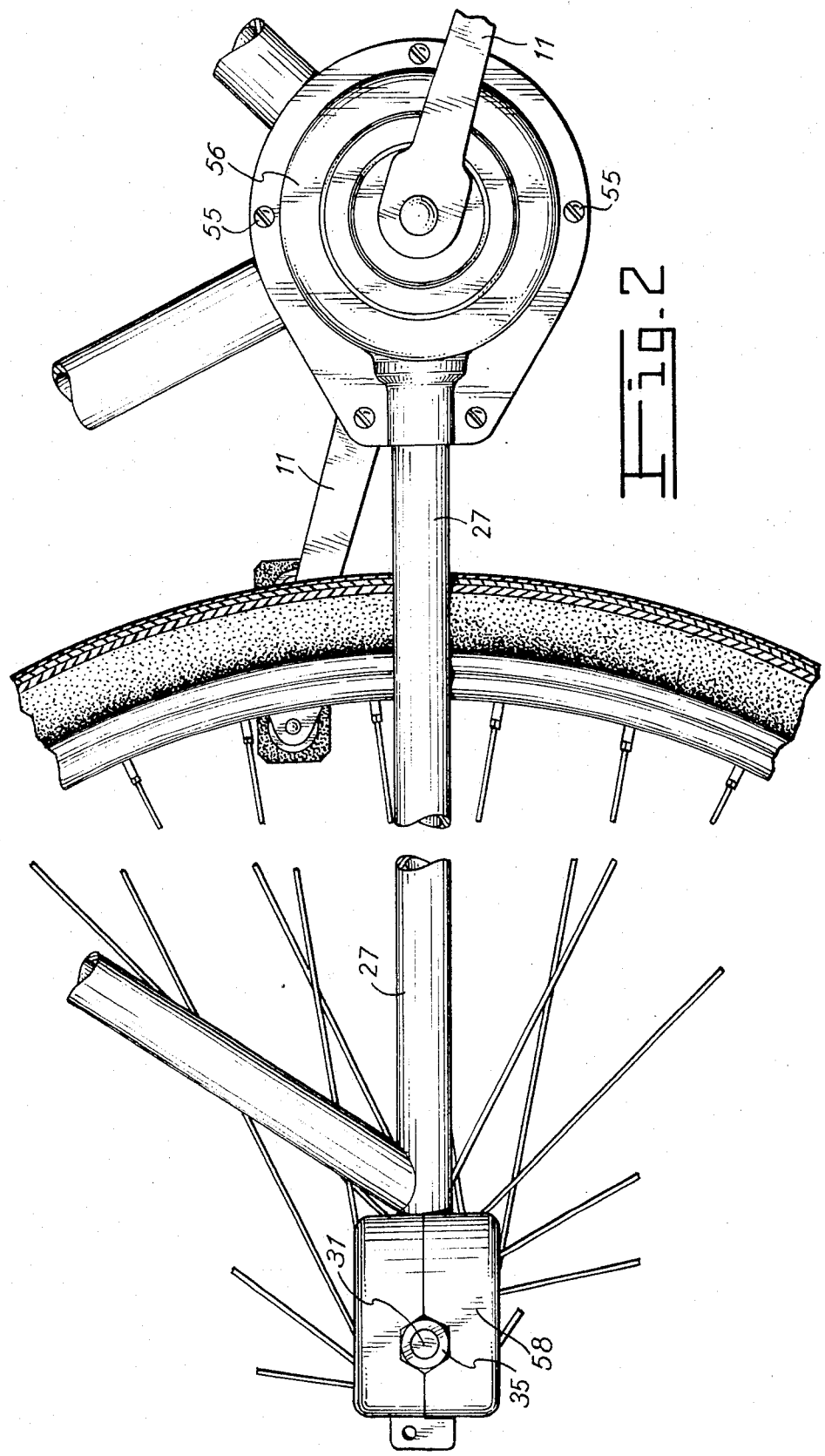
Figure 3:
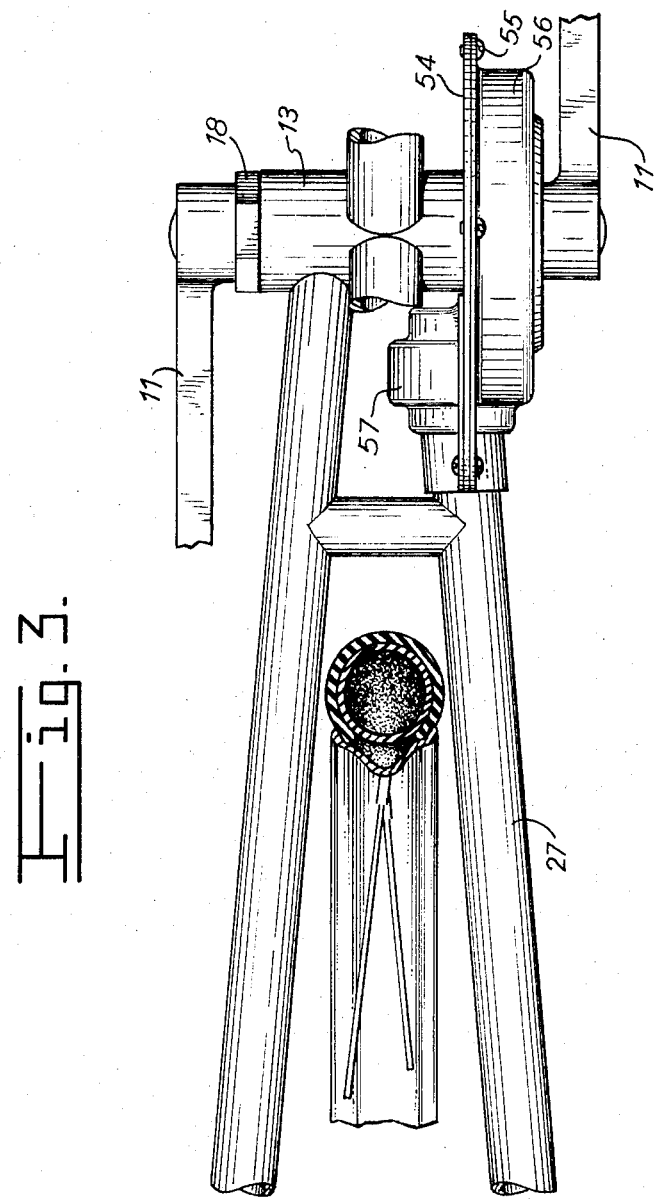
Figure 3:
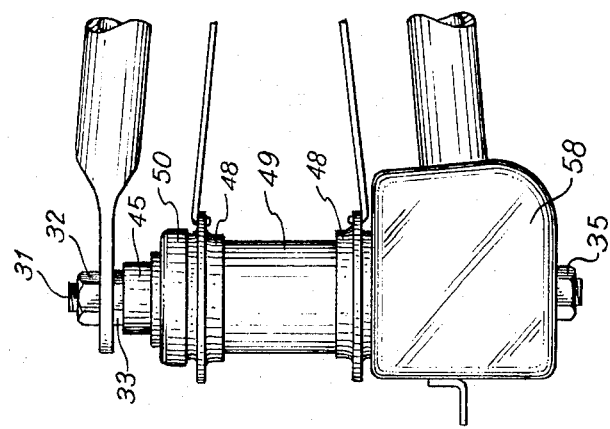

Of the foregoing we see that the fixed cone 45 is also used for adjustment of the free wheel mechanism 26, because it provides greater or less contact between the balls 53 and the hub. In order for the entire transmission system to be totally covered as shown in FIG. 3, an eccentric plate 54 is provided welded at its middle to the supporting tube 13 and at its eccentric portion to the tube 27 of the back fork, to which eccentric plate 54 are suitably fixed, —for example by means of bolts 55—suitable covers 56 and 57. Said covers 56 and 57 house the portion of the cylindrical axle 12 extending beyond the supporting tube 13, the crown wheel 16 and the portion projecting from the shaft 20, in conjunction with the pinion 19. Finally, the joining portion of the shaft 20 with the free wheel mechanism 26 together with the beam 34 are housed within a box 58, same being fixed to said beam 34 and tube 27. Therefore, with these covers 56 and 57 and box 58 the direct transmission system for bicycles of the present invention is totally housed.

From the foregoing description, we can see that we obtain a bicycle transmission involving no complication whatsoever, since by means of the pedals 11 the bicycle rider transmits movement through the cylindrical axle 12 to the crown wheel 16, which in turn transmits it to the shaft 20 by means of the pinion 19. Thereafter the shaft 20 transmits said movement to the free wheel mechanism 26, by means of the conical gear 25 indented with the conical gear portion 40 of the mobile cone 39. Lastly, this mobile cone 39 transmits the movement to the bicycle's rear wheel hub, said rear wheel obtaining in this manner the suitable rotation.

In spite of the foregoing description which refers to a specific embodiment of the invention, all those skilled in the art should understand that any change in form and detail will be included within the range and scope of same.

I claim:

1. A direct transmission system for a bicycle, which bicycle comprises wheels, a central axle and a frame constituted by an inclined tube, a vertical tube and tubes forming forks for supporting said wheels, said forks corresponding to an upper back fork, a lower back fork and a front fork; said direct transmission system comprising a cylindrical axle corresponding to the bicyles's central axle; pedals fixed at the ends of said cylindrical axle; a crown wheel threadedly fixed to an end portion of said cylindrical axle; a shaft coupled to said cylindrical axle; conical gears fixed at the ends of said shaft, being one of said conical gears, called pinion, indented to said crown wheel; free wheel means coupled to the other of said conical gears fixed to said shaft; housing means for covering said cylindrical axle; said crown wheel, said shaft, and said conical axle, fixing means for correspondingly fastening said cylindrical axle, and said shaft to said housing means which comprises pressure bushings including ends, one of said ends protruding from said supporting tube, same including recesses; balls housed in said recesses and wherein a washer is comprised in that end of said cylindrical axle including the crown wheel, said washer being located between said crown wheel and the corresponding one of said pressure bushings; and wherein a nut is threadedly fixed to the other end of said cylindrical axle, said nut being located registering with the corresponding other of said pressure bushings.

2. A direct transmission system for bicycles according to claim 1, wherein the housing means for covering said shaft is a tube corresponding to one of said tubes of the lower back fork of the bicycle frame and wherein the fixing means for fastening said shaft to said one tube of the lower back fork comprises pressure bushings with one of their ends protruding from said one tube, said one end protruding including an inside chamber; and balls housed in said inside chamber.

3. A direct transmission system for bicycles according to claim 1, wherein said end of said shaft fixing said pinion, comprises a plain square section portion and a threaded portion, being said pinion supported in said plain square section portion and fixed by a nut and a nut lock threaded at said threaded portion; and wherein the other end of said shaft is a threaded portion that fixes said other of said conical gears.

4. A direct transmission system for bicycles according to claim 1, wherein said free wheel means comprises a fixed threaded axle, coupled by fastening means to said tubes of the lower back fork of said bicycle frame; a nut lock and spacer device threadly fixed at one end of said threaded axle; a cone fixed to said threaded axle, registering with said nut lock and spacer; a mobile cone coupled to said threaded axle; ball means for allowing said mobile cone to rotate; a sleeve having one of its end portions threadly coupled to one end of said mobile cone; a stopping device located between said mobile cone and said sleeve; a fixed cone threadly coupled to said threaded axle, said fixed cone having one of its ends lodged in that portion of said sleeve opposite to said portion threadly coupled with said mobile cone; a hub housing said fixed cone, said mobile cone, said stopping device and said sleeve, said hub fixed by said mobile cone and said fixed cone; and means for permitting said hub to rotate, said means registering with said mobile cone and said fixed cone.

5. A direct transmission system for bicycles according to claim 4, wherein said fastening means that couple the threaded axle to said lower back fork tubes, are an angled beam welded on one end to said one tube of the lower back fork housing said shaft and on the other end said angled beam fixes said threaded axle; a nut threaded to said threaded axle end fixed by said angled beam; and a nut and a nut lock threaded to said threaded axle end fixed by the tube opposite to said tube of said lower back fork supporting said shaft.

6. A direct transmission system for bicycles according to claim 4, wherein said mobile cone comprises its end portion opposite to said end threadly coupled to said sleeve, as a conical gear portion, which conical gear portion indents with said other conical gear threadly fixed to said shaft, and its end portion threadly coupled to said sleeve, as a threaded portion; a central recess in said conical gear portion, said central recess registering with said threaded axle and housing said ball means; and shoulders in said conical gear portion opposite to said central recess, said shoulders supporting said means for permitting said hub to rotate.

7. A direct transmission system for bicycles according to claim 4, wherein said fixed cone comprises shoulders in said portion registering with said means for permitting said hub to rotate, said shoulders supporting same.

8. A direct transmission system for bicycles according to claim 4, wherein said hub comprises three elements, viz two supporting end portions for the bicycle wheel spokes and a central tubular portion to couple said supporting end portions.

9. A direct transmission system for bicycles according to claim 8, wherein a plate fitting and a gasket are included coupled to said fixed cone, for same movably fixing the corresponding one of said supporting end portions of said hub; and wherein a relevant gasket is included coupled to said mobile cone in its said conical gear portion, for same movably fixing the corresponding other of said supporting end portions of said hub.

10. A direct transmission system for bicycles according to claim 4, wherein a spiral spring is included supported by said end portion of said fixed cone lodged in said sleeve, which spiral spring guides said sleeve.

11. A direct transmission system for bicycles according to claim 8, wherein said housing means for covering said crown wheel and said pinion is an eccentric plate welded by its middle to said supporting tube and by its eccentric portion to said one tube of said lower back fork housing said shaft, and two covers fixed to said eccentric plate; and wherein said housing means for covering said other conical gear oppositely fixed to said pinion, is a box fixed to said angled beam and to the corresponding one of said supporting end portions of said hub.

* * * * *